April 7, 1936.    H. H. BAKER    2,036,909
DEHYDRATING DEVICE
Original Filed April 20, 1929    2 Sheets-Sheet 1
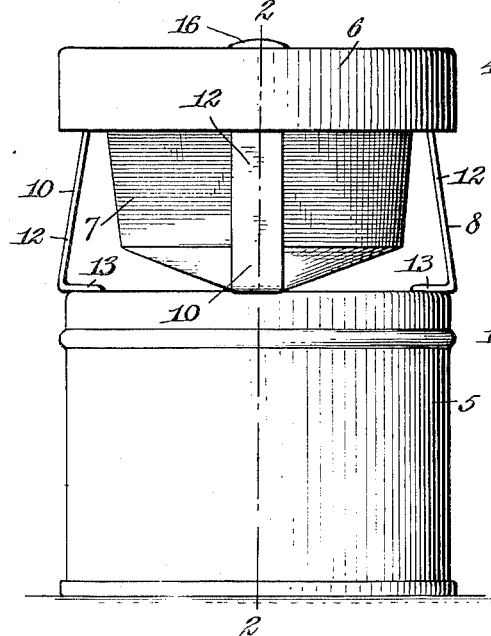
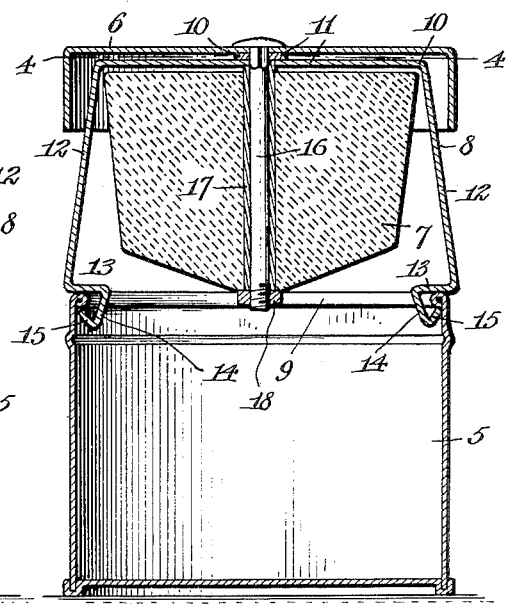
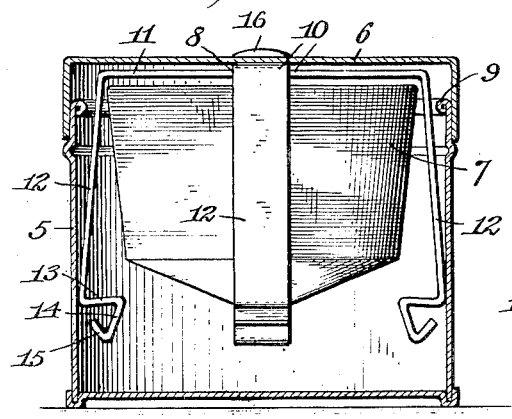
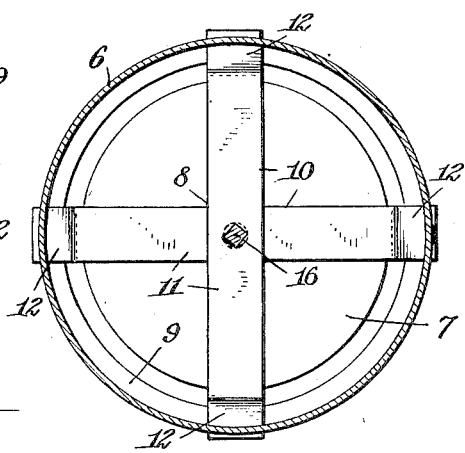
Howard H. Baker, Inventor.
By Emil Neuhart
Attorney.

April 7, 1936.                H. H. BAKER                2,036,909
                          DEHYDRATING DEVICE
             Original Filed April 20, 1929    2 Sheets-Sheet 2
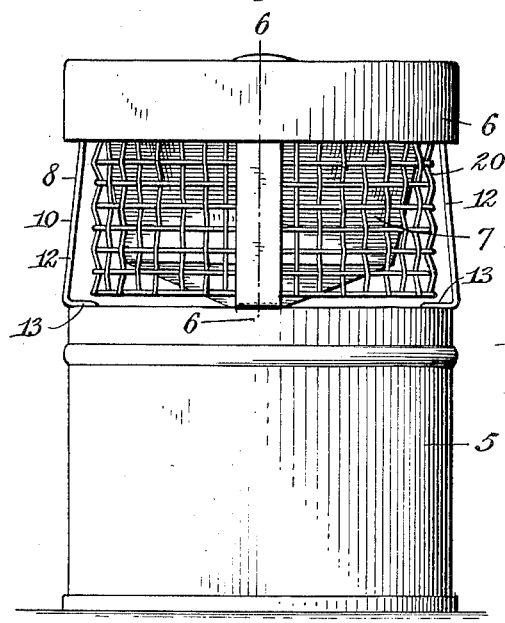
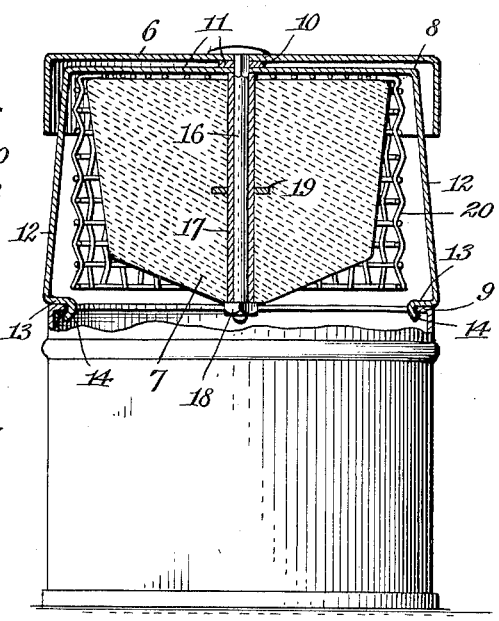
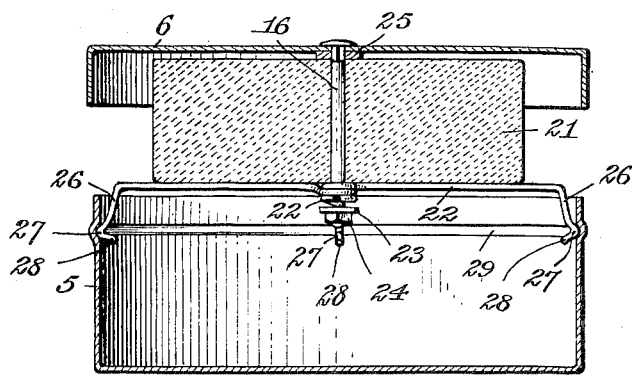
Howard H. Baker, Inventor.
By Emil Neuhart
            Attorney.

Patented Apr. 7, 1936

2,036,909

UNITED STATES PATENT OFFICE 2,036,909

DEHYDRATING DEVICE

Howard H. Baker, Buffalo, N. Y.

Refiled for abandoned application Serial No. 356,705, April 20, 1929. This application July 12, 1933, Serial No. 680,158

14 Claims. (Cl. 183—4)

This invention relates to a container for functioning elements or substances, such, for example as dehydrating elements or substances adapted for absorbing dampness and moisture in cellars, vaults, warehouses, stock rooms, poultry houses, and innumerable other places where it is desired to keep the air pure and surroundings dry. While particularly adapted for dehydrating purposes, the invention is also effective for use in containing a fumigating, deodorizing, scenting, or other element or substance which it may be desirable to retain in an air-tight manner, and at times expose to the air for functioning as such.

This application is a substitute for my prior application filed April 20, 1929, Serial No. 356,705, and allowed November 28, 1931.

One of the objects of my invention is to provide a container for a functioning element or substance so constructed that the element or substance therein will be enclosed in a substantially air-tight manner when not in use, and which embodies in its construction means to permit of quickly exposing said element or substance when desired, so that it will function when exposed to the air or surrounding portions, and especially in the case of a dehydrating substance so that it will absorb moisture from the air or surrounding portion of a building or other object or product in which or in connection with which it may be used; it being as well adapted for keeping confectionery, baked goods, and other commodities in dry and crisp condition.

Considering the invention as primarily a dehydrating device, another object of my invention is the provision of a dehydrating device having a container in which a hygroscopic substance or composition is enclosed in an air-tight manner when not in use, and which substance or composition can be quickly and conveniently exposed so that it will attract moisture and deliver the accumulated moisture into the container.

Still another object of my invention is the provision of a dehydrating device in which the dehydrating unit is in solid form and suspended or otherwise positioned in any suitable manner over a water accumulating or retaining receptacle or casing.

A further object of my invention is the provision of a dehydrating device, comprising a water-receiving receptacle, a cover for the same, and a dehydrating composition in suitable form carried by the cover, but completely enclosed in a substantially air-tight manner when the cover is placed upon said receptacle and exposed when the cover is elevated; the cover having suitable means applied thereto for automatically supporting it on the sides of the receptacle when lifting it from the latter.

A still further object of my invention is to provide a dehydrating device, which includes a dehydrating composition and a guard to prevent poultry from attacking the composition when the device is used in a poultry house, the device being particularly adapted for use in breeding turkeys, due to the necessity of keeping such poultry in dry surroundings.

With the above and other objects in view the invention consists in the arrangement and combination of parts, and in the novel features of construction to be hereinafter described and more particularly pointed out in the subjoined claims.

In the drawings:

Fig. 1 is a side elevation of my improved dehydrating device, with the cover elevated to expose the dehydrating unit.

Fig. 2 is a central vertical section through the device taken on line 2—2, Fig. 1.

Fig. 3 is a view similar to Fig. 2, showing the cover closed over the upper open end of the receptacle portion of the device and the dehydrating composition enclosed in an air-tight manner within the receptacle by means of said cover.

Fig. 4 is a horizontal section taken on line 4—4, Fig. 2.

Fig. 5 is a side elevation of the device showing the same equipped with a guard to prevent poultry from attacking the dehydrating composition.

Fig. 6 is a sectional elevation of the device as shown in Fig. 5, the sectional portion being taken on line 6—6, Fig. 5.

Fig. 7 is a central vertical section of a modified form of my invention, but the container element is illustrated in different form and may be a fumigating, deodorizing, or other element.

Although this invention is adapted for purposes other than dehydrating, I refer to it primarily as a dehydrating device, and the device comprises a receptacle 5, a cover 6 having a depending flange adapted to snugly fit onto the upper marginal portion of the wall of said receptacle so as to render the receptacle practically air-tight, a dehydrating composition or unit 7, preferably in solid form, suspended from the cover, and means 8 for supporting the cover in elevated position so as to expose the dehydrating composition or unit suspended therefrom, said means engaging the upper edge of the wall of the receptacle to support said cover above and in spaced relation to said receptacle and to position the dehydrating composition or unit a considerable distance from the bottom of the receptacle so that the accumulated water or liquid of deliquescence may accumulate within the receptacle to a high level without coming in contact with the dehydrating unit.

The receptacle, which may also be termed a "can", may be of any desired construction, but should be water-tight. It preferably is cylindrical in cross section and has stop means at the upper edge of its peripheral wall, preferably in the form of an inwardly-directed rim or bead 9. This receptacle or can may be varied in form and construction, and the cover 6 which is co-axial with the receptacle, is preferably applied to the upper marginal portion of the peripheral wall of the receptacle or can by a slip connection fitting tightly all around the can; but it may be otherwise applied, if desired.

Fastened to the under side of the cover 6 are two spring yoke-like supporting members 10, which are disposed at right angles to each other. Each of these supporting members comprises a cross bar 11 and two depending spring arms 12 bent inwardly near their lower ends, as at 13, to form offset rests or supporting portions, thence downwardly and outwardly, as at 14, as shown in Figs. 2 and 3, and finally upwardly and outwardly, as at 15, forming substantially triangular retainer terminals, the extremities of which engage the rim or bead 9 under the inherent resiliency of said arms and serve as stops, while the inwardly-directed portions 13 bear against the upper edge of the peripheral wall of the receptacle or can and serve to support the weight of the cover and dehydrating unit secured thereto.

In Figs. 5 and 6 these cross bars 11 have the terminals at their lower ends of slightly different form in that the downwardly and outwardly-directed portions 14 are shortened and the upwardly and outwardly-directed portions 15 shown in Figs. 2 and 3 are entirely dispensed with. It will therefore be seen that these retaining terminals may be variously formed without departing from my invention.

The cross bar of one of these spring yoke-like supporting members lies in contact with the inner surface of the cover, while the other of said members lies in contact with the under side of said first-mentioned member, which it crosses at right angles as stated. The depending spring arms 12 are therefore arranged on quarters, and when the cover is lowered, points of these arms directly above the triangular or other retainer terminals lie against the inner surface of the peripheral wall of the receptacle or can.

When elevating the cover, the spring arms move upwardly in contact with the inner surface of the peripheral wall of the can until the inwardly-directed portions 13 thereof pass over the upper edge of said wall, whereupon the arms spring outwardly to cause the under sides of said inwardly-directed portions to be seated against the upper edge of said peripheral wall and the terminals of the triangular retainer portions engage the rim or bead 9, thus locking the cover in elevated position against movement both upwardly and downwardly. The bead 9 is shown of slightly different formation in Figs. 5 and 6.

A securing bolt or similar fastening medium 16 is passed axially through the cover and through the crossed portions of the cover supporting members, and suspended underneath the cover by means of this bolt or other similar fastening medium is the dehydrating unit 7, which is preferably solid and in the form of a cone inverted on said bolt, the apex being at the extreme lower end of the unit. The dehydrating unit is formed of suitable hygroscopic material, or a composition including a hygroscopic material, such as calcium chlorid or the like molded into solid form. The dehydrating unit is preferably molded onto a brass or other tube 17 disposed axially therein and of a size to receive the bolt 16 which extends therethrough; the bolt having a nut 18 applied to its lower end, which is threaded and projects beneath the apex of the conical unit; said nut bearing against the lower end of the tube 17 disposed axially within said conical member.

Since, in some instances, the functioning element may be of a nature to slightly soften when subjected to extreme heat, it is likely to become loose upon the tube 17, and to guard against this I provide the tube, preferably between its ends, with a projection, preferably in the form of a brass or other metallic ring 19, Fig. 6, pressed onto the tube so that in effect it is integral with the tube. This projection may be otherwise formed and fastened to the tube, or it may be integral with the tube, as may be desired.

When the cover is elevated as shown in Figs. 1 and 2 of the drawings, it serves as a canopy and the dehydrating unit, or the hygroscopic material applied to the under side of the cover, is exposed to the atmospheric air and attracts the moisture in the air, with the result that this moisture or liquid of deliquescence travels downwardly along the inverted conical surface of the dehydrating unit and drips from the apex or point thereof into the receptacle where it accumulates. The receptacle can be readily emptied of the condensed moisture or accumulated water, by inverting the device, but this is preferably done after pressing two or more of the spring arms 12 of the supporting members inwardly to disengage the extremities of said arms from the rim or bead 9, after which the cover may be completely disconnected from the receptacle and the water poured from the latter.

In the modification shown in Figs. 5 and 6, a reticulated guard 20 is placed around the dehydrating unit, and this guard is preferably constructed of wire mesh material. It is of cylindrical form, open at the top and bottom, and is of a diameter slightly larger than the base or wide upper end of the dehydrating unit. The upper end of this guard is bent or flanged inwardly over the dehydrating unit so as to lie against the lower cross bar of the pair of supporting members 10, to which it may be soldered or otherwise secured so that it will be immovably connected to the cover when the securing bolt 16 is fastened in place. The tightening of the nut on said bolt causes the upper surface of the dehydrating unit to be forced against the flanged upper end of the guard, the lower cross bar against the upper cross bar, and the upper cross bar against the inner surface of the cover, thus securely connecting all parts attached to the cover by means of a single fastening medium. This guard permits the atmospheric air to reach the dehydrating unit and prevents anything coming in contact with said unit. The use of a guard of this kind is highly desirable in dehydrating devices of this kind placed in poultry houses, since it prevents the poultry attacking the unit or drinking the accumulated water in the container and becoming ill from the effects thereof.

While I prefer to use a solid inverted conical dehydrating unit, it is, of course, apparent that the unit may be otherwise formed, and that it is within the province of my invention to employ hygroscopic matter in forms other than solid, so long as it is exposed to atmospheric air upon opening the cover; the matter being preferably supported by the cover and exposed when opening the latter, as when lifting and supporting the cover on the receptacle.

In Fig. 7 I have shown a comparatively shallow container and a somewhat modified form of supporting element for retaining the cover in elevated position. The construction set out in this figure is adapted for fumigating or deodorizing purposes, and since it is not necessary when utilizing the invention for such purposes to have the body of the container water-tight, it is nevertheless air-tight or made to approach an air-tight condition; reliance being placed upon the increased exposure of the substance when the cover is lifted. In this modification the functioning or servicing element is indicated by the numeral 21 and may be of a nature to enable the bolt 16 to be passed directly therethrough so as to dispense with the tube 7 shown in the previous figures.

In lieu of the supporting members 11 I employ in this construction supporting elements 22 formed of wire coiled midway between their ends around the bolt 16, directly beneath the functioning or servicing element 21, and extending radially therefrom in opposite directions. These supporting elements, like the supporting elements 11, are preferably arranged on the quarters and therefore are disposed at right angles to each other, but they may be otherwise radially disposed if desired. A washer 23 is applied to the bolt and bears against the under side of the lower of these supporting elements, and a nut 24 is threaded onto the bolt and bears against said washer.

I also prefer to employ a washer 25 between the cover and the upper surface of the functioning or servicing element. Upon tightening the nut 24, such element is retained in position on the cover, and by means of the supporting elements 22 both this functioning or servicing element and the cover are supported in elevated position. For this purpose the radiating arms of these supporting elements are bent downwardly and outwardly, as at 26, within the container, thence fashioned into arcuate form near their ends, as at 27, and finally terminated in inwardly-directed portions 28. Said arcuate portions 27 are adapted to snap into a depressed portion of the can, preferably arranged in the form of an annular groove 29.

Having thus described my invention, what I claim is:

1. A dehydrating device, comprising a receptacle adapted to retain water, a cover to close said receptacle in a substantially air-tight manner, a dehydrating substance secured to the inner side of said cover and adapted to be closed within said receptacle when said cover is in closed position and to be exposed when said cover is elevated from said receptacle, and means to hold the cover in elevated position to elevate said dehydrating substance and allow the liquid of deliquescence to drip therefrom into said casing and to prevent said dehydrating substance from coming in contact with the accumulated liquid within said casing.

2. A dehydrating device, comprising a receptacle adapted to retain water, a cover for said receptacle adapted to close the same in a substantially air-tight manner, a dehydrating unit suspended axially from said cover, and means applied to said cover adapted to engage the confining wall of said receptacle for holding said cover in spaced relation to the upper edge of said receptacle and to expose said dehydrating unit to atmospheric air to elevate said dehydrating substance and allow the liquid of deliquescence to drip therefrom into said casing and to prevent said dehydrating substance from coming in contact with the accumulated liquid within said casing.

3. A dehydrating device, comprising a receptacle adapted to retain water, a cover for closing said receptacle in substantially air-tight manner, a dehydrating unit fastened to the inner side of said cover and being in solid form and of conical formation, said unit tapering downwardly to cause the liquid of deliquescence to drip from the apex thereof, and means for holding said cover in elevated position with respect to said receptacle so as to expose said dehydrating unit to atmospheric air and to elevate said dehydrating unit and allow accumulation of the liquid of deliquescence within said casing without coming in contact with said dehydrating unit.

4. A dehydrating device, comprising a receptacle adapted to retain water, a cover for closing said receptacle, supporting arms depending from said cover and adapted to hold the cover above and in spaced relation to said receptacle, and a dehydrating composition applied to the under side of said cover and exposed to atmospheric air when said cover is elevated and also to elevate said dehydrating substance and allow the liquid of deliquescence to drip therefrom into said casing and to prevent said dehydrating substance from coming in contact with the accumulated liquid within said casing.

5. A dehydrating device, comprising a receptacle and a cover co-axial therewith and forming an air-tight enclosure when closed upon said receptacle, and a dehydrating substance within said enclosure co-axial therewith, said cover being separable from said receptacle and having means applied thereto for positively holding it in co-axially spaced relation to said receptacle to admit atmospheric air to said dehydrating substance and to carry the weight of said dehydrating substance.

6. A dehydrating device, comprising a receptacle adapted to retain water, a cover for said receptacle, means applied to said cover including spring arms normally engaging the inner surface of the wall of said receptacle and inwardly-bent portions adapted to interlock with the upper edge of said receptacle when elevating said cover, and a dehydrating unit applied to the under side of said cover and movable therewith, said dehydrating unit possessing the qualities of attracting moisture and being of a form to cause the moisture to drip therefrom and be deposited in said receptacle when the cover is elevated.

7. A dehydrating device, comprising a receptacle adapted to retain water, a cover for said receptacle, said receptacle and cover forming an air-tight enclosure when said cover is closed, means for holding said cover elevated from said receptacle to serve as a canopy therefor, a dehydrating unit within said enclosure, and a reticulated guard surrounding said dehydrating unit and fastened by clamping said guard between said unit and said cover.

8. A dehydrating device, comprising a receptacle adapted to retain water, a cover for said receptacle to close the latter in an air-tight manner, a plurality of spring arms depending from said cover and entering said receptacle when closed by said cover, said spring arms having offset rests engaging the upper edge of said receptacle when the cover is elevated, and a dehydrating unit positioned between said spring arms and exposed to atmospheric air when said cover is held elevated from said receptacle.

9. A dehydrating device, comprising a receptacle adapted to retain water and having an internal rim at its upper edge, a cover having a depending flange adapted to fit around the upper marginal portion of said receptacle, substantially U-shaped supporting members arranged in crossed relation and fastened to the under side of said cover, said supporting members including depending spring arms having means at their lower ends adapted to interlock with said rim and rest upon the upper edge of the confining wall of said receptacle, and a downwardly-tapering dehydrating unit applied to the under side of said cover between the spring arms of said supporting members, said dehydrating unit and said cover when elevated being supported by the inter-locking means and said dehydrating unit being enclosed in an air-tight manner when said cover is lowered to close said receptacle and being exposed to atmospheric air when said cover is elevated and supported by said spring arms.

10. A dehydrating device, comprising a receptacle adapted to retain water and having an internal bead at the upper edge of its peripheral wall, a cover for said receptacle having two substantially yoke-like supporting members arranged at right angles to each other and each having a pair of depending spring arms bent inwardly near their lower ends, thence outwardly and downwardly, and finally upwardly and outwardly to provide substantially triangular terminals, the inwardly bent portions of said spring arms being adapted to rest upon the upper edge of said peripheral wall when said cover is elevated and the terminals of said upwardly and outwardly-directed portions being adapted to engage underneath said internal bead, and a dehydrating unit enclosed within said receptacle when the cover is closed and exposed to atmospheric air when the cover is elevated and supported in its elevated position by said spring arms.

11. A dehydrating device, comprising a receptacle adapted to retain water and having stop means at its upper edge projecting inwardly from its peripheral wall, a cover adapted to close said receptacle and having supporting members entered into said receptacle when said cover is closed, said supporting members including depending portions provided at their lower ends with means to rest upon the upper edge of the peripheral wall of said receptacle and with means adapted to engage the stop means of said peripheral wall, and means for attracting moisture confined in an air-tight manner in the receptacle when said cover is closed and exposed to atmospheric air when the cover is elevated.

12. A dehydrating device, comprising a receptacle adapted to retain water, a cover for said receptacle adapted to close the same in an air-tight manner, supporting means for said cover comprising two substantially U-shaped members having cross bars arranged at right angles and overlying each other and depending arms adapted to engage the upper edge of the peripheral wall of said receptacle when the cover is elevated, a dehydrating unit of conical formation inverted underneath said cross bars, a reticulated guard surrounding said dehydrating unit and having its upper end flanged inwardly over said unit, and a bolt passed downwardly through said cover, said cross bars and said unit and serving to clamp said parts together and to clamp the flanged portion of said guard between said dehydrating unit and at least one of said cross bars.

13. A dehydrating device, comprising a receptacle adapted to retain water, a cover applicable to the upper end of said receptacle or supportable in spaced relation to said upper end, means to support said cover in spaced relation to the upper end of said receptacle, and a dehydrating unit molded in solid form and having a sleeve extending axially therethrough, a bolt passed through said cover and through the sleeve of said dehydrating unit, and a nut applied to the lower end of said bolt.

14. A container for containing a functioning element, comprising a body portion and a cover for closing the same in a substantially air-tight manner, a dehydrating substance axially supported by said cover from the inner side thereof and adapted to be closed within said body portion when said cover is in closed position and to be exposed when said cover is elevated from said body portion, spring arms carried by said cover and movably engaging the peripheral wall of said body portion, said spring arms having means to support said cover when elevated and said dehydrating substance and to prevent axial movement of said cover and said dehydrating substance when said cover is in elevated position.

HOWARD H. BAKER.